United States Patent [19]

Aoki

[11] Patent Number: 5,164,833
[45] Date of Patent: Nov. 17, 1992

[54] ELECTRONIC VIEWFINDER

[75] Inventor: Tetsushi Aoki, Hachioji, Japan

[73] Assignee: Konica Corporation, Tokyo, Japan

[21] Appl. No.: 801,600

[22] Filed: Dec. 2, 1991

Related U.S. Application Data

[63] Continuation of Ser. No. 612,334, Nov. 13, 1990, abandoned.

[30] Foreign Application Priority Data

Nov. 15, 1989 [JP] Japan .................................. 1-296444

[51] Int. Cl.[5] .......................... H04N 5/30; H04N 5/225
[52] U.S. Cl. ...................................... 358/224; 358/909
[58] Field of Search ................... 358/224, 909, 209, 54, 358/213.19, 32, 164, 168, 41, 181, 183, 213.31; 354/219, 222, 224, 75, 110, 120, 290, 76

[56] References Cited

U.S. PATENT DOCUMENTS

| | | | |
|---|---|---|---|
| 4,489,349 | 12/1984 | Okada | 358/168 |
| 4,763,146 | 8/1988 | Niikura | 354/75 |
| 4,769,699 | 9/1988 | Gebauer et al. | 358/97 |
| 4,788,565 | 11/1988 | Masuda et al. | 354/75 |
| 4,887,161 | 12/1989 | Watanabe et al. | 358/224 |
| 4,888,605 | 12/1989 | Matsumoto | 354/75 |
| 4,949,117 | 8/1990 | Van Heyningen et al. | 354/412 |
| 4,969,045 | 11/1990 | Haruki et al. | 358/228 |
| 5,023,650 | 6/1991 | Hoshino et al. | 354/441 |

Primary Examiner—James J. Groody
Assistant Examiner—Safet Metjahic
Attorney, Agent, or Firm—Jordan B. Bierman

[57] ABSTRACT

A display apparatus for an electronic image having an image memory for storing video image data of a number of fields or a number of frames, which are obtained by processing, with a signal processing circuit, a video image signal from an image detecting element on which reflected light from a subject is imaged through an optical system and displaying video image data stored in the image memory to form a picture having the desired field or frame on a display unit. The apparatus includes a timing generating circuit for generating a vertical synchronizing signal by which video image data derived from a video memory, in units of fields or frames, is displayed as video image data on the display section, and a control means, responsive to the vertical synchronizing signal from the timing generating circuit, for sequentially switching video image data derived from the video memory of the desired frame or field, to supply the video image data to the display unit.

5 Claims, 4 Drawing Sheets

ELECTRONIC VIEWFINDER

This application is a continuation of application Ser. No. 07/612,334, filed Nov. 13, 1990, now abandoned.

BACKGROUND OF THE INVENTION

1. Field of the Invention

The present invention generally relates to viewfinders and, more particularly, is directed to an electronic viewfinder which displays thereon a video image information from an image pickup element.

2. Description of the Prior Art

Recently, a silver salt film camera having an electronic viewfinder has been proposed, in which an incident light from a camera lens is imaged on a silver salt film and on an image pickup element and a video image information from the image pickup element is monitored by a display apparatus.

According to this electronic viewfinder, video image informations concerning the normal photographing except multiple exposure photographing can be monitored by a display apparatus, which is convenient for a cameraman to confirm the video image data after the picture is taken.

However, when the cameraman utilizes the salt film camera having the above-described electronic viewfinder and reduces exposure per picture to take a picture in the multiple exposure mode where a plurality of video images are overlapped, there is then the following problem. That is, a latitude of the image pickup element is about ⅓ of that of the silver salt film so that, when a picture taken in the multiple exposure mode is displayed by the electronic viewfinder using an image pickup element, a picture portion on the low brightness side is darkened. On the other hand, if the latitude of the low brightness side is matched with that of the silver salt film, this time, a picture portion on the high brightness side is saturated and whitened. A phenomenon in which a picture is partly or wholly whitened or darkened due to extreme difference of brightness will be hereinafter referred to as a deteriorated picture.

Therefore, in the electronic viewfinder, in order to prevent the picture portion on the low brightness side from being produced as the deteriorated picture, it is proposed that an automatic gain control (AGC) section is provided to increase a gain of the low brightness side for adjusting the brightness. This proposal, however, encounters with a problem such that if the gain of the low brightness side is increased, a noise also is amplified to cause the image quality of the picture to be deteriorated. Further, if a means for avoiding the deteriorated picture on the low brightness side is realized by an electronic circuit, there is the disadvantage that the circuit arrangement thereof is complicated.

SUMMARY OF THE INVENTION

Accordingly, it is an object of the present invention to provide an improved electronic viewfinder in which the aforenoted shortcomings and disadvantages of the prior art can be substantially eliminated. More specifically, it is an object of the present invention to provide an electronic viewfinder for use with a silver salt camera or the like and in which a photographed result of a multiple exposure photographing can be monitored.

As a first aspect of the present invention, an electronic viewfinder is provided, in which a reflected light from an object is imaged by an image pickup element via an optical system, a video image signal from the image pickup element is processed by a signal processing circuit to generate video image data of a plurality of field or a plurality of frames and the video image data is stored in a video memory and the video image data recorded in the video memory and which forms a picture of desired field or desired frame is reproduced by a display section. This electronic viewfinder is comprised of a timing generating circuit for generating a vertical synchronizing signal by which video image data derived from the video memory in unit of fields or frames is displayed on the display section and a switching circuit responsive to the vertical synchronizing signal from the timing generating circuit to sequentially switch video image data derived from the video memory in unit of desired frame or field and supplying the video image data to the display section.

As a second aspect of the present invention, if the video image data of field or frame generated from the signal processing circuit has a data amount corresponding to the number of pixels of the display section, it is possible to achieve more remarkable effects.

In accordance with a third aspect of the present invention, if the signal processing circuit generates additive analog R, G, B video data, the electronic viewfinder of this invention can achieve much more remarkable effects.

In accordance with a fourth aspect of the present invention, the video image data of field or frame generated from the signal processing circuit may have a data amount corresponding to the arrangement of a color filter provided on the display section.

The above, and other objects, features and advantages of the present invention will be apparent in the following detailed description of an illustrative embodiment when read in conjunction with the accompanying drawings, in which like reference numerals are used to identify the same or similar parts in the several views.

DETAILED DESCRIPTION OF THE PREFERRED EMBODIMENT

An embodiment of the present invention will hereinafter be described with reference to the accompanying drawings.

Figure 1:
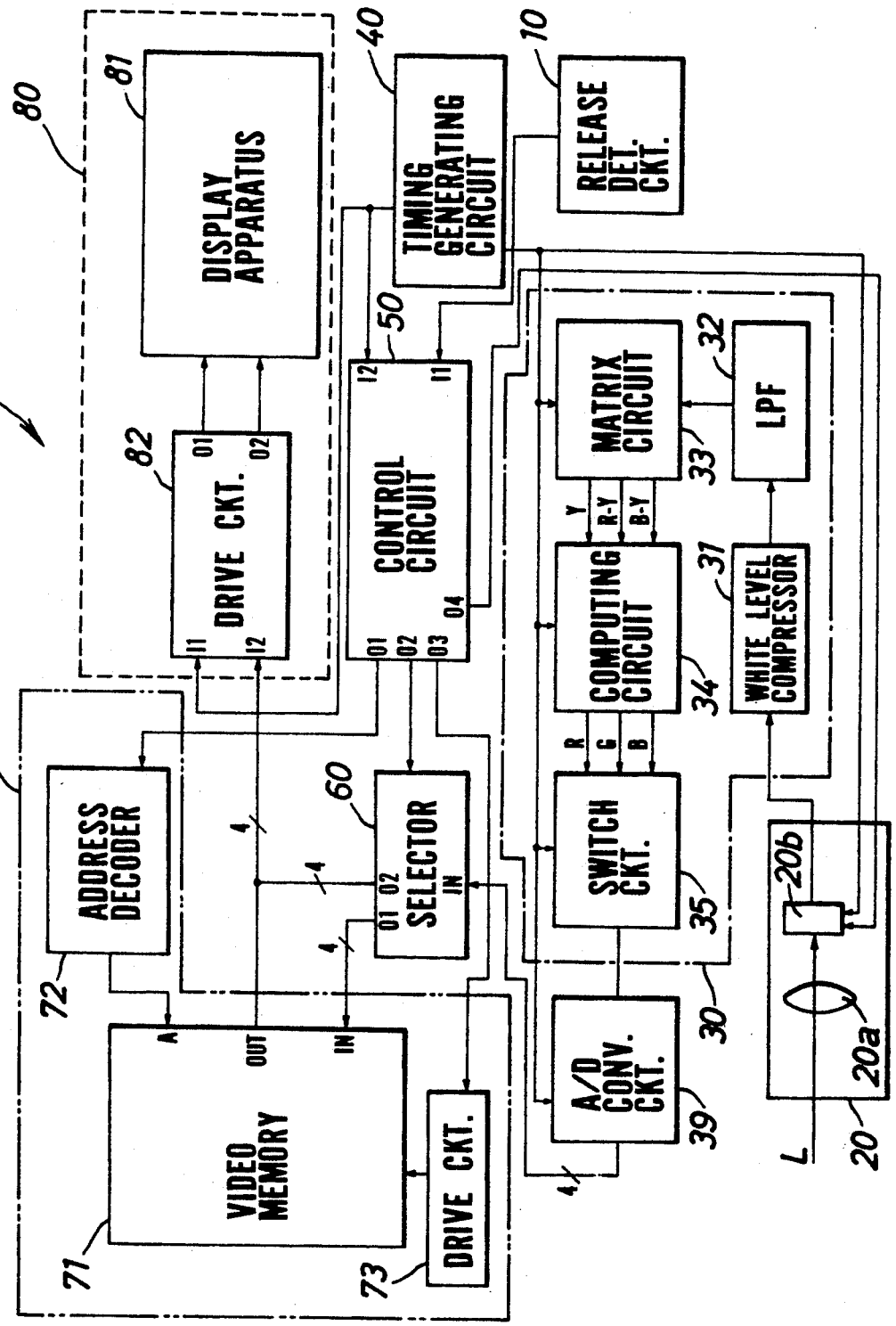
FIG. 1 is a schematic block diagram of an embodiment of an electronic viewfinder according to the present invention.

FIG. 1 is a block diagram schematically showing an arrangement of an electronic viewfinder according to an embodiment of the present invention.

The electronic viewfinder of this embodiment is adapted to monitor a video image information from an image pickup element as a plurality of field or frame pictures on its display portion during one second. Particularly, video image data forming a desired one picture (field or frame picture) recorded in a video memory is supplied to the display portion by sequentially switching the video image data of desired one picture on the basis of a vertical synchronizing signal used to display a picture of the display portion so that a plurality of video images are sequentially switched and displayed on the display portion. Thus, the electronic viewfinder of this invention is suitable for a cameraman to confirm beforehand a composition or the like when the cameraman takes a picture particularly in the multiple exposure photographing mode.

It will be seen in FIG. 1 that an electronic viewfinder 100 is comprised of a camera section 20, a signal processing circuit 30, a video image recording section 70, a display section 80, a timing generating circuit 40, a control section 50, a selector 60, a release detecting circuit 10 and an analog-to-digital (A/D) converting circuit 39. The camera section 20, the signal processing circuit 30, the A/D converting circuit 39 and the selector 60 constitute a camera system.

The release detecting circuit 10 is adapted to designate a picture to be reproduced.

In the camera section 20, a reflected light L from an object is traveled through an optical system 20a and imaged on an image pickup element 20b such as a charge coupled device (CCD) or the like. This light image focused on the image pickup element 20b is converted into an electrical signal and a video image signal which results from sampling the electrical signal by a timing signal which is provided by frequency-dividing a vertical synchronizing (vsync.) signal in a predetermined manner is supplied to the signal processing circuit 30.

The signal processing circuit 30 is adapted to separate the video image signal from the camera section 20 to provide an analog red signal (R), an analog green signal (G) and an analog blue (B) signal. The signal processing circuit 30 is comprised of a white level compression circuit 31, a low-pass filter (hereinafter referred to as an LPF) 32, a matrix circuit 33, a computing circuit 34 and a switch circuit 35. The video image signal from the camera section 20 is supplied to the signal processing circuit 30. In the signal processing circuit 30, the video image signal is inverted and compressed in white level by the white level compressing circuit 31, waveform-shaped by the LPF 32 and is computed by the matrix circuit 33, thereby being separated into a luminance signal Y and red and blue color difference signals R-Y and B-Y. The luminance signal Y and color difference signals R-Y and B-Y are supplied to the computing circuit 34, in which they are computed to provide an analog red signal (R), an analog green signal G and an analog blue signal (B), which are then fed to the switch circuit 35. The switch circuit 35 switches the analog red, green and blue signals R, G and B to data in that order, and supplies these data to the A/D converting circuit 39. Video image data generated from the signal processing circuit 30 in unit of field or frame is equal in data amount to the arrangement of a color filter (not shown) provided within a display section 80. The signal processing circuit 30 may be arranged such that the matrix circuit 33, for example, generates only the luminance signal Y in order to cope with a monochromatic video image. At that time, video image data generated from the signal processing circuit 30 in unit of field or frame may have an amount corresponding to the number of picture elements (i.e. pixels) in the aforementioned display section 80.

The video image recording section 70 is adapted to record video image data of a plurality of picture screens and to read-out video image data of desired picture screen randomly. As shown in FIG. 1, the video image recording section 70 is comprised of a video memory 71, an address decoder 72 and a drive circuit 73. The video memory 71 is formed of, for example, a static random access memory (RAM) and has a storage capacity of storing therein video image data of a plurality of pictures. The drive circuit 73 responds to a read or write command signal from the control circuit 50 to switch the input and output of data of the video memory 71 such as when a data input terminal IN or data output terminal OUT of the video memory 71 is made high in impedance if data of picked-up video memory 71 is made high in impedance if data of picked-up video image is selected by the selector 60 which controls the input and output of the video memory 71 and is directly displayed. The address decoder 72 designates, for example, a starting address 71 to video image data of one picture in the video memory.

The timing generating circuit 40 generates and transmits various clock signals such as a vertical synchronizing (vsync.) signal indicative of a timing at which one picture (e.g. frame or field) of the display apparatus, a drive timing of the image pickup element or a drive timing of the signal processing circuit 30.

The control circuit 50 is adapted to designate an apparatus (the display section 80 or the video image recording section 70) which inputs video image data derived mainly from the signal processing circuit 30 and to control the read and write of video image data in the video image recording section 70.

The selector 60 responds to a select signal from the control circuit 50 to select the path through which the video image data from the signal processing circuit 30 is transmitted. More precisely, the selector 60 switches a circuit or section to which the video image data from the A/D converting circuit 39 is supplied, thereby the video image data being supplied to an input terminal I2 of the drive circuit 82 or the selector 60 supplies the video image data to an input terminal IN of the video memory 71.

The display section 80 is adapted to reproduce a video image of the video image data of one picture from the video image memory 71 by driving desired picture elements of display apparatus in which picture elements are arranged, for example, in the longitudinal and lateral directions (X-Y matrix fashion). This display section 80 is comprised of the display apparatus 81 and the drive circuit 82. The display apparatus 82 is a liquid crystal display apparatus such as LCD or the like which displays, for example, a field video image. The drive circuit 82 determines brightness and hue of each of the pixels in the arrangement of pixels provided in the display apparatus 81 on the basis of video image data of the units of one picture and stops the light emission of each picture element on the basis of horizontal and vertical synchronizing signals. Also, the drive circuit 82 determines brightness and hue of each of the picture elements in the pixel arrangement provided in the display apparatus 81 on the basis of video image data transmitted from the video memory 71. The display apparatus 81 is not limited to the arrangement in which the picture elements are arranged in an X-Y matrix fashion and may be applied to such an arrangement in which pixels are arranged in a two-dimensional plane. Also the display apparatus 81 may be a monochromatic display apparatus.

The recording and reproducing operations of the electronic viewfinder 100 of this embodiment will be described hereinafter.

FIGS. 6 to 10 show examples of pictures wherein a cameraman takes picture of different subjects of house, yacht, street lamp, man and hat in the dark background.

Figure 2:
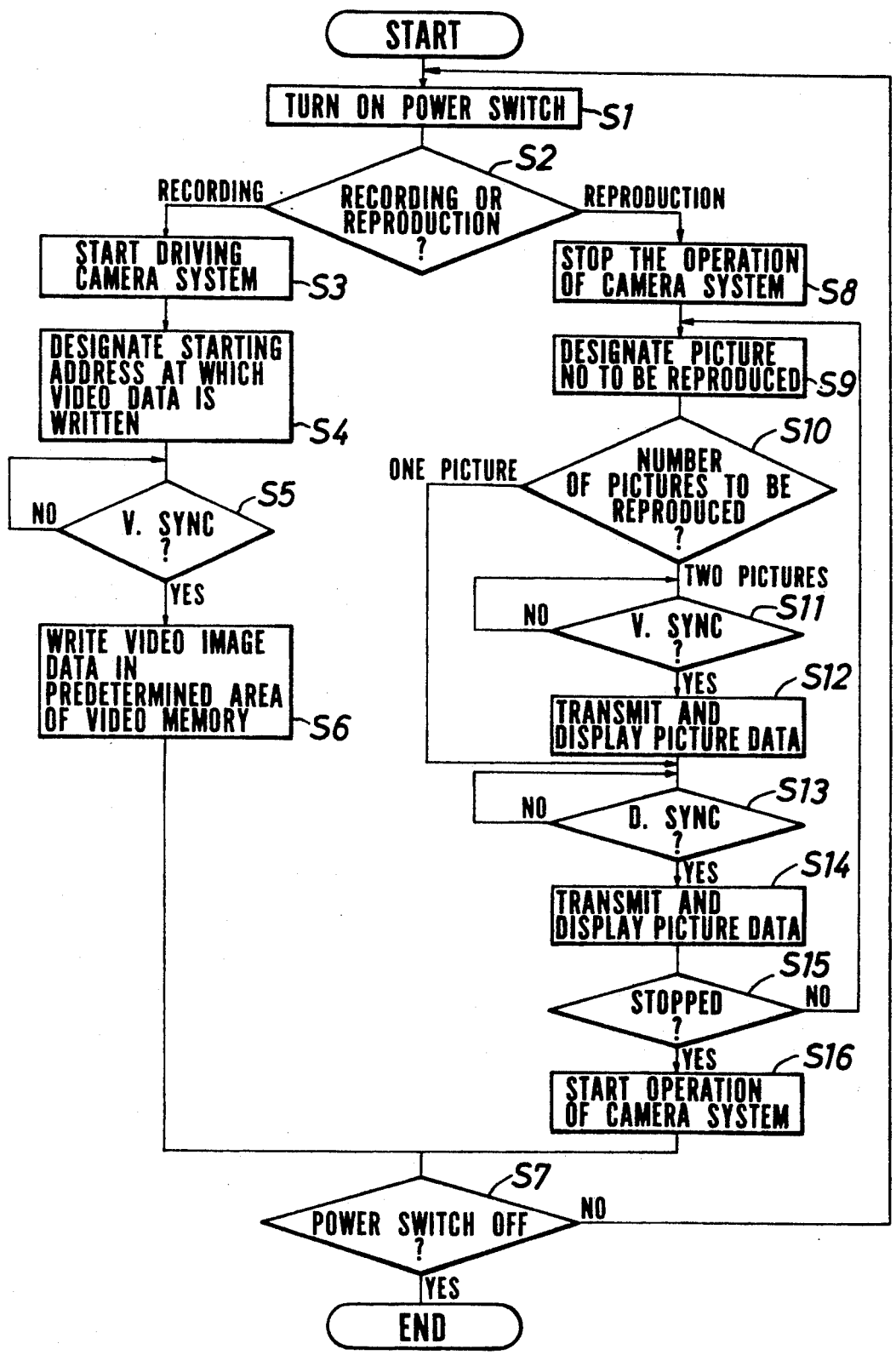
FIG. 2 is a flow chart to which reference will be made in explaining a video image recording and reproducing operation of the electronic viewfinder according to the embodiment of the present invention.

FIG. 2 is a flow chart to which reference will be made in explaining the recording and reproducing operations of the electronic viewfinder of this embodiment.

Referring to FIG. 2, following the start of operation, if the power switch (not shown) is turned ON (in step S1), then a message for determining whether the recording or reproduction should be performed is displayed on a display (not shown) in step S2. Having detected that the recording mode is determined by the cameraman (in step S2), the release detecting circuit 10 drives the camera section 20 via the control circuit 50. Therefore, in the camera section 20, a reflected light from a subject is imaged by an image pickup element via an optical system, and a light image imaged by the image pickup element is converted into an electrical signal. Then, this electrical signal is sampled by a timing signal from the timing generating circuit 40 to provide a video image signal. This video image signal is supplied to the signal processing circuit 30.

In the signal processing circuit 30, the video image signal from the camera section 20 is inverted and compressed in white level by the white level compressing circuit 31, waveform-shaped by the LPF 32 and fed to the matrix circuit 33, in which it is processed to provide the luminance signal Y and the red and blue color difference signals R-Y and B-Y. The luminance signal Y and the red and blue color difference signals R-Y and B-Y are then computed by the computing circuit 34 to provide the analog red signal R, the analog green signal G and the analog blue signal B, which are fed to the switch circuit 35. The switch circuit 35 switches the analog red signal R, the analog green signal G and the analog blue signal B to provide a serial analog R, G, B signal, which is fed to the A/D converting circuit 39.

In the A/D converting circuit 39, the serial analog R, G, B signal is converted into digital video data and the digital video data are fed to the input terminal IN of the selector 60 (in step S3).

The control circuit 50 supplied a write command signal to the drive circuit 73, supplies a select signal to the selector 60 and supplies an address signal to the address decoder 72. In the video image recording section 70, the video memory 71 is set in the writable state, that is, made low in impedance at its data output terminal OUT and also made high in impedance at its data input terminal IN by the write command signal from the drive circuit 73. The address decoder 72 responds to the address signal from the control circuit 50 to supply the address input terminal A of the video memory 71 with address value at which the video image data is written (in step S4).

When the control circuit 50 detects the next vertical synchronizing signal derived from the timing generating circuit 40, the control circuit 50 supplies the select signal to the selector 60. By the select signal supplied thereto from the control circuit 50, the selector 60 is made low in impedance at its output terminal 02 and is therefore inhibited from supplying the video image data to the input terminal I2 of the drive circuit 82, thereby the video image data being supplied to the data input terminal IN of the video memory 71.

Thus, the video image data of one picture is written in a predetermined area of the video memory 71 (in step S6). When the aforementioned steps S3 to S6 are repeated five times, video image data of 5 pictures (5 fields or 5 frames) shown in FIGS. 6 to 10 are recorded the predetermined areas of the video memory 71 of the video image recording section 70.

Figure 3:
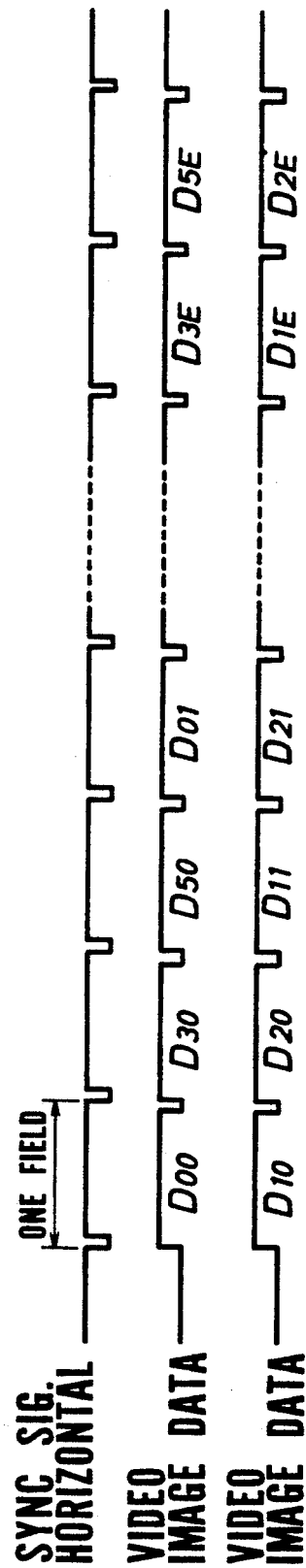
FIG. 3 is a flow chart to which reference will be made in explaining a video image reproducing operation wherein pictures of two picture screens and three picture screens are synthesized.
Figure 4:
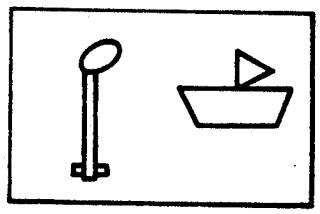
FIG. 4 is a schematic diagram showing a picture which results from synthesizing pictures of two picture screens.
Figure 5:
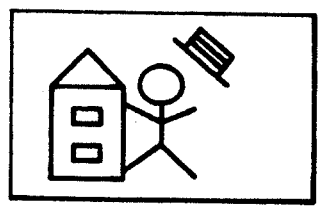
FIG. 5 is a schematic diagram showing a picture which results from synthesizing pictures of three picture screen.
Figure 7:
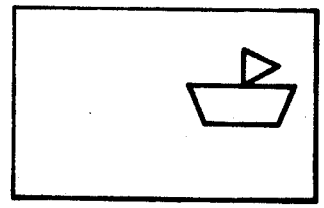
Figure 8:
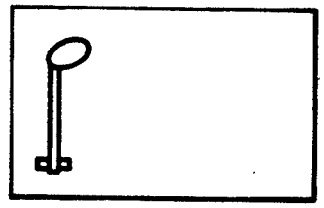

FIG. 3 is a timing chart used in understanding the operation of the video image recording section 70, and to which reference will be made in explaining how to synthesize video images of two and three picture screens. FIG. 4 is a schematic representation of a video image which results from synthesizing video images of two picture screens shown in FIGS. 7 and 8, and FIG. 5 is a schematic representation of a video image which results from synthesizing video images of three picture screen shown in FIGS. 6, 9 and 10.

A reproducing operation, which is one of the most specific features of the electronic viewfinder 100 of this embodiment, will be explained with reference to the flow chart forming FIG. 2.

with reference to FIG. 2, following the Start of operation, the power switch (not shown) is turned ON (in step S1) and the message for determining the recording mode or the reproducing mode is displayed on the display (not shown) at step S2. If the release detecting circuit 10 determines that the cameraman selects the reproducing mode (in step S2), then the control circuit 50 stops the operation of the camera system (in step s8).

In step S9, of a plurality of pictures, a desired picture number to be reproduced is designated by the switch. If the two pictures shown in FIGS. 7 and 8 are designated (in step S10), then the release detecting circuit 10 supplies the control circuit 50 with a picture designating signal which designates the second and third pictures. The control circuit 50 supplies starting addresses of the second and third pictures to a memory of an output port and also supplies a read command signal to the drive circuit 73.

The control circuit 50 detects the next vertical synchronizing signal supplied thereto from the timing generating circuit 40 and alternately supplies two addresses to the address decoder 72 from the memory of the output port on the basis of the vertical synchronizing signal.

In the video image recording section 70, the video memory 71 is set in the readable state, that is, made high in impedance at its data output terminal OUT and made low in impedance at its data input terminal IN by the command signal from the drive circuit 73. A reading operation of video image data in the video image recording section 70 will be explained with reference to the timing chart of FIG. 3. The control circuit 50 alternately transmits address signals which designate two address from the memory of the output port on the basis of the vertical synchronizing signal from the timing generating circuit 40, and the address decoder 72 supplies address values of the aforementioned address signals to the address input terminal of the video memory 71. The video memory 71 reads out video image data from the address values and supplies the same to the drive circuit 73 from its data output terminal OUT. Thus, in the display section 80, the drive circuit 82 detects the vertical synchronizing signal and alternately holds video image data $D_{10}$ and $D_{20}$ on the basis of the vertical synchronizing signal so that the drive circuit 82 determines brightness and hue of each of the pixels in the arrangement of pixels provided on the display apparatus 81 from the video image data of one picture unit held on the basis of the synchronizing signal from the timing generating circuit 40 and illuminates the determined pixels. As described above, the display apparatus 81 of the display section 80 alternately displays thereon the picture of FIG. 7 or 8 at, for example, every one sixtieth of a second with the result that the picture, which results from synthesizing the two pictures, is displayed as shown in FIG. 4 from a visual standpoint (steps S11 to S14).

Figure 6:
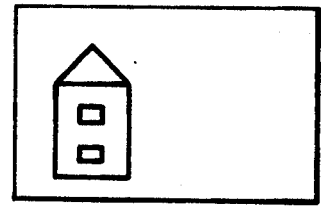
FIGS. 6 to 10 are schematic representations of examples of pictures in which pictures of different objects, house, yacht, street lamp, man and hat in the dark background, respectively.
Figure 9:
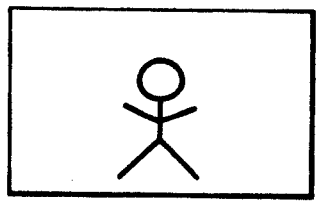
Figure 10:
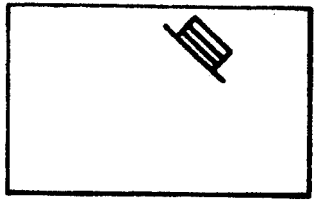

If the pictures are designates as, for example, shown in FIGS. 6, 9 and 10, the display apparatus 81 in the display section 80 detects the next vertical synchronizing signal and alternately displays the pictures of FIGS. 6, 9 and 10 at every sixtieth of a second on the basis of the vertical synchronizing signal, resulting in a picture, which is provided by synthesizing three pictures, being displayed as shown in FIG. 5 from a visual standpoint.

As set out above, according to the electronic viewfinder of the present invention, different video image data written in the video memory are switched at, for example, every field and alternately displayed so that the picture can be displayed as the picture which results from synthesizing a plurality of pictures.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. An electronic viewfinder having an image memory for storing video image data of a plurality of fields or a plurality of frames, said viewfinder comprising:
    an image pickup element for converting light reflected from an object to an image signal;
    a signal processing circuit for generating image data of a field or a frame corresponding to said object based on said image signal,
    a memory for storing said image data;
    a display for reproducing said field or said frame based on said image data in said memory;
    a timing generating circuit for providing a vertical synchronizing signal for sending said image data from said memory to said display;
    a selector for selecting at least two desired fields or frames from said memory; and
    controller for sending image data corresponding to the selected fields or frames to said display in synchronism with said vertical synchronizing signal from said timing generating circuit to form composite pictures by combining the selected fields or frames on said display.

2. The electronic viewfinder of claim 1, wherein the video image data in unit of field or frame generated from said signal processing circuit has a data amount corresponding to the number of pixels of said display section.

3. The electronic viewfinder of claim 2, wherein said signal processing circuit generates video image data of additive analog R, G and B image data.

4. The electronic viewfinder of claim 1, wherein the video image data in unit of field or frame generated from said signal processing circuit has a data amount corresponding to an arrangement of a color filter provided in said display section.

5. The electronic viewfinder of claim 1 wherein said controller alternately sends image data corresponding to the selected fields or frames to said display in synchronism with said synchronizing signal.

* * * * *